US007518782B2

(12) United States Patent
Maeda

(10) Patent No.: US 7,518,782 B2
(45) Date of Patent: Apr. 14, 2009

(54) ELECTROPHORETIC DEVICE, DRIVING METHOD THEREOF, AND ELECTRONIC APPARATUS

(75) Inventor: Hiroshi Maeda, Hara-mura (JP)

(73) Assignee: Seiko Epson Corporation (JP)

( * ) Notice: Subject to any disclaimer, the term of this patent is extended or adjusted under 35 U.S.C. 154(b) by 42 days.

(21) Appl. No.: 11/768,952

(22) Filed: Jun. 27, 2007

(65) Prior Publication Data

US 2008/0007816 A1 Jan. 10, 2008

(30) Foreign Application Priority Data

Jul. 4, 2006 (JP) ............................ 2006-184858
Mar. 22, 2007 (JP) ............................ 2007-075476

(51) Int. Cl.
*G02F 26/00* (2006.01)
*G09G 3/36* (2006.01)
*G09G 3/34* (2006.01)

(52) U.S. Cl. ......................... 359/296; 345/107; 345/98

(58) Field of Classification Search ................... 345/90, 345/92, 98, 107; 359/296
See application file for complete search history.

(56) References Cited

U.S. PATENT DOCUMENTS 6,756,962 B1 * 6/2004 Akimoto et al. ............... 345/98
7,443,371 B2 * 10/2008 Fujikawa ..................... 345/96
2008/0238867 A1 * 10/2008 Maeda et al. ............... 345/107
2008/0238899 A1 * 10/2008 Yamada ...................... 345/204

FOREIGN PATENT DOCUMENTS

JP 2003-84314 3/2003

* cited by examiner

*Primary Examiner*—David N Spector
(74) *Attorney, Agent, or Firm*—Harness, Dickey & Pierce, P.L.C.

(57) ABSTRACT

An electrophoretic device, a driving method thereof, and an electronic apparatus including the same are provided. The electrophoretic device includes a switching element; a latch circuit having an input terminal connected to an output terminal of the switching element; and an electrophoretic element that contains an electrophoretic material between its first and second electrodes, the first electrode being connected to the output terminal of the latch circuit. The method includes a step (a) of supplying a reference potential to the second electrode, turning ON the switching element in synchronization with the supply of the reference potential, and supplying a data signal to the input terminal of the latch circuit, whereby the reference potential or a first potential higher than the reference potential is output from the output terminal of the latch circuit; a step (b) of supplying a driving signal alternating between the reference potential and a second potential higher than the first potential to the second electrode; and a step (c) of supplying the reference potential to the second electrode.

5 Claims, 10 Drawing Sheets

100

20

ELECTROPHORETIC DEVICE, DRIVING METHOD THEREOF, AND ELECTRONIC APPARATUS

BACKGROUND

1. Technical Field

The present invention relates to an electrophoretic device, a driving method thereof, and an electronic apparatus including the electrophoretic device as a display section.

2. Related Art

There are known display devices utilizing electrophoretic elements (see JP-A-2003-084314, for example) In JP-A-2003-084314, there is disclosed an active-matrix electrophoretic display device having a configuration in which a memory circuit is included in each of a plurality of pixels. In such a configuration, since picture signals (data signals) are retained for each pixel, it is possible to realize an electrophoretic display device having a decreased number of writing operations. Thus, there is a need for a specific driving technology that allows higher contrast display while taking advantage of the combined configuration of the electrophoretic element and the memory circuit. There is also a need for further decreasing the size (mounting area) of peripheral circuits required for the driving.

SUMMARY

An advantage of some aspects of the invention is that it provides a technology for improving display quality of an electrophoretic device having a combination of an electrophoretic element and a memory circuit while decreasing the overall size of circuits used in the electrophoretic device.

In accordance with a first aspect of the invention, there is provided an electrophoretic device including a switching element; a latch circuit that receives an output signal from the switching element as its input signal; and an electrophoretic element that contains an electrophoretic material between its first and second electrodes, wherein the first electrode is driven by the output signal from the latch circuit, and wherein the latch circuit drives the first electrode using a plurality of different potentials without changing data stored therein.

In accordance with a second aspect of the invention, there is provided a driving method for driving an electrophoretic device, wherein the electrophoretic device including a switching element; a latch circuit having an input terminal connected to an output terminal of the switching element; and an electrophoretic element that contains an electrophoretic material between its first and second electrodes, the first electrode being connected to the output terminal of the latch circuit, and wherein the method including a step (a) of supplying a reference potential to the second electrode, turning ON the switching element in synchronization with the supply of the reference potential, and supplying a data signal to the input terminal of the latch circuit, whereby the reference potential or a first potential higher than the reference potential is output from the output terminal of the latch circuit; a step (b) of supplying a driving signal alternating between the reference potential and a second potential higher than the first potential to the second electrode; and a step (c) of supplying the reference potential to the second electrode.

In accordance with a third aspect of the invention, there is provided an electrophoretic device, including a switching circuit; a latch circuit having an input terminal connected to an output terminal of the switching element; an electrophoretic element that contains an electrophoretic material between its first and second electrodes, the first electrode being connected to the output terminal of the latch circuit; a first power supply control circuit that controls a power supply potential to be supplied to the latch circuit; a first driver that controls turning ON of the switching element; a second driver that supplies a data signal to the input terminal of the latch circuit; and a second power supply control circuit that controls a potential to be supplied to the second electrode of the electrophoretic element, wherein in a first driving period, the second power supply control circuit supplies the reference potential to the second electrode, the first driver turns ON the switching element, the second driver supplies a data signal to the input terminal of the latch circuit, and the first power supply control circuit supplies the reference potential or a first potential higher than the reference potential, wherein in a second driving period subsequent to the first driving period, the second power supply control circuit supplies a driving signal alternating between the reference potential and a second potential higher than the first potential to the second electrode, and wherein in a third driving period subsequent to the second driving period, the second power supply control circuit supplies the reference potential to the second electrode.

According to the foregoing aspects of the invention, since particles (for example, black and white particles) contained in the electrophoretic material are mixed with each other, latent images are not displayed on the pixel section at the time of subsequent display control operations, thereby realizing a high-quality display. Since an operation of writing data into the latch circuit is performed using a low-potential signal, it is not necessary to install a level shifter circuit in a circuit for the data writing operation. Accordingly, it is possible to decrease the overall circuit size.

Preferably, in the step (c), a third potential higher than the first potential is output from the output terminal of the latch circuit. Preferably, the third potential is produced by changing a power supply potential of the latch circuit.

With such a configuration, it is possible to further increase a display contrast and a display speed.

In accordance with a fourth aspect of the invention, there is provided a driving method for driving an electrophoretic device, wherein the electrophoretic device including a switching element; a latch circuit having an input terminal connected to an output terminal of the switching element; and an electrophoretic element that contains an electrophoretic material between its first and second electrodes, the first electrode being connected to the output terminal of the latch circuit, and wherein the method including a step (a) of turning ON the switching element and supplying a data signal to the input terminal of the latch circuit, whereby a reference potential is output from the output terminal of the latch circuit; a step (b) of supplying a driving signal alternating between the reference potential and a second potential higher than the reference potential to the second electrode; and a step (c) of supplying the reference potential to the second electrode, turning ON the switching element in synchronization with the supply of the reference potential, and supplying the data signal to the input terminal of the latch circuit, whereby the reference potential or a first potential higher than the reference potential is output from the output terminal of the latch circuit.

In accordance with a fifth aspect of the invention, there is provided an electrophoretic device, including a switching circuit; a latch circuit having an input terminal connected to an output terminal of the switching element; an electrophoretic element that contains an electrophoretic material between its first and second electrodes, the first electrode being connected to the output terminal of the latch circuit; a first power supply control circuit that controls a power supply potential to be supplied to the latch circuit; a first driver that controls turning ON of the switching element; a second driver that supplies a data signal to the input terminal of the latch circuit; and a second power supply control circuit that controls a potential to be supplied to the second electrode of the electrophoretic element, wherein in a first driving period, the first driver turns ON the switching element, the second driver supplies the data signal to the input terminal of the latch circuit, and the first power supply control circuit supplies the reference potential, wherein in a second driving period subsequent to the first driving period, the second power supply control circuit supplies a driving signal alternating between the reference potential and a second potential higher than the reference potential to the second electrode, and wherein in a third driving period subsequent to the second driving period, the second power supply control circuit supplies the reference potential to the second electrode, the first driver turns ON the switching element, the second driver supplies the data signal to the input terminal of the latch circuit, and the first power supply control circuit supplies the reference potential or a first potential higher than the reference potential to the output terminal of the latch circuit.

According to the foregoing aspects of the invention, since particles (for example, black and white particles) contained in the electrophoretic material are mixed with each other, the electrophoretic element is controlled to preferentially display only a single color tone. In this way, by controlling to preferentially display such a single color tone and then other color tones, it is possible to realize a high-quality display. Since an operation of writing data into the latch circuit is performed using a low-potential signal, it is not necessary to install a level shifter circuit in a circuit for the data writing operation. Accordingly, it is possible to decrease the overall circuit size.

Preferably, the driving method for driving an electrophoretic device according to the foregoing aspects of the invention further includes a step (d) of outputting a third potential higher than the first potential from the output terminal of the latch circuit after the step (c). Preferably, the third potential is produced, for example, by changing a power supply potential of the latch circuit.

With such a configuration, it is possible to further increase a display contrast and a display speed.

In accordance with a seventh aspect of the invention, there is provided a driving method for driving an electrophoretic device, wherein the electrophoretic device including a switching element; a latch circuit having an input terminal connected to an output terminal of the switching element; and an electrophoretic element that contains an electrophoretic material between its first and second electrodes, the first electrode being connected to the output terminal of the latch circuit, and wherein the method including a step (a) of supplying a reference potential to the second electrode, turning ON the switching element in synchronization with the supply of the reference potential, and supplying a data signal to the input terminal of the latch circuit, whereby the reference potential or a first potential higher than the reference potential is output from the output terminal of the latch circuit; and a step (b) of supplying a driving signal alternating between the reference potential and a second potential higher than the first potential to the second electrode and outputting the reference potential or the second potential from the output terminal of the latch circuit in synchronization with the supply of the driving signal.

In accordance with a seventh aspect of the invention, there is provided an electrophoretic device, including a switching circuit; a latch circuit having an input terminal connected to an output terminal of the switching element; an electrophoretic element that contains an electrophoretic material between its first and second electrodes, the first electrode being connected to the output terminal of the latch circuit; a first power supply control circuit that controls a power supply potential to be supplied to the latch circuit; a first driver that controls turning ON of the switching element; a second driver that supplies a data signal to the input terminal of the latch circuit; and a second power supply control circuit that controls a potential to be supplied to the second electrode of the electrophoretic element, wherein in a first driving period, the second power supply control circuit supplies the reference potential to the second electrode, the first driver turns ON the switching element, and the second driver supplies the data signal to the input terminal of the latch circuit, whereby the reference potential or a first potential higher than the reference potential is output from the output terminal of the latch circuit, and wherein in a second driving period subsequent to the first driving period, the second power supply control circuit supplies a driving signal alternating between the reference potential and a second potential higher than the first potential to the second electrode, and the first power supply control circuit supplies the reference potential or the second potential to the output terminal of the latch circuit.

According to the foregoing aspects of the invention, since an alternating driving signal supplied after the writing operation of writing the data signal (image data signal) has a higher potential than that of the data signal, it is possible to realize a high-quality and high-contrast display while reducing current consumption. Since an operation of writing data into the latch circuit is performed using a low-potential signal, it is not necessary to install a level shifter circuit in a circuit for the data writing operation. Accordingly, it is possible to decrease the overall circuit size.

Preferably, in the step (b), the second potential is output by changing a power supply potential of the latch circuit.

Preferably, the driving method for driving an electrophoretic device according to the foregoing aspects of the invention further includes a step (c) of outputting a third potential higher than the first potential and lower than the first potential from the output terminal of the latch circuit. In this case, as "the third potential," a potential that is sufficiently low enough to maintain a state where the data is retained in the latch circuit can be used.

With such a configuration, it is possible to maintain a displaying state while reducing power consumption.

Preferably, the driving method for driving an electrophoretic device according to the foregoing aspects of the invention further includes a step (d) of supplying a driving signal alternating between the reference potential and a second potential higher than the first potential to the second electrode and outputting the reference potential or the second potential from the output terminal of the latch circuit in synchronization with the supply of the driving signal.

With such a configuration, it is possible to retain or boost a display contrast.

Preferably, the number of pulses included in the driving signal supplied in the step (d) is smaller than that of the driving signal supplied in the step (b).

With such a configuration, it is possible to further reduce power consumption.

In accordance with an eighth aspect of the invention, there is provided an electronic apparatus including the electrophoretic device according to the foregoing aspects of the invention as a display section. In the invention, "electronic apparatus" may be any apparatus including a display section adopting display using an electrophoretic material. The "electronic apparatus" may be a display apparatus, a television apparatus, electronic paper, a watch, an electronic calculator, a cellular phone, a portable information terminal, or the like. In addition, the concept of "apparatus" may include, for example, a flexible paper-like or film-like object, an object belonging to a fixed property, such as a wall surface, onto which such a paper-like or film-like object is attached, or an object belonging to a moving body, such as a vehicle, a flying vehicle, or a ship.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings.

Figure 1:
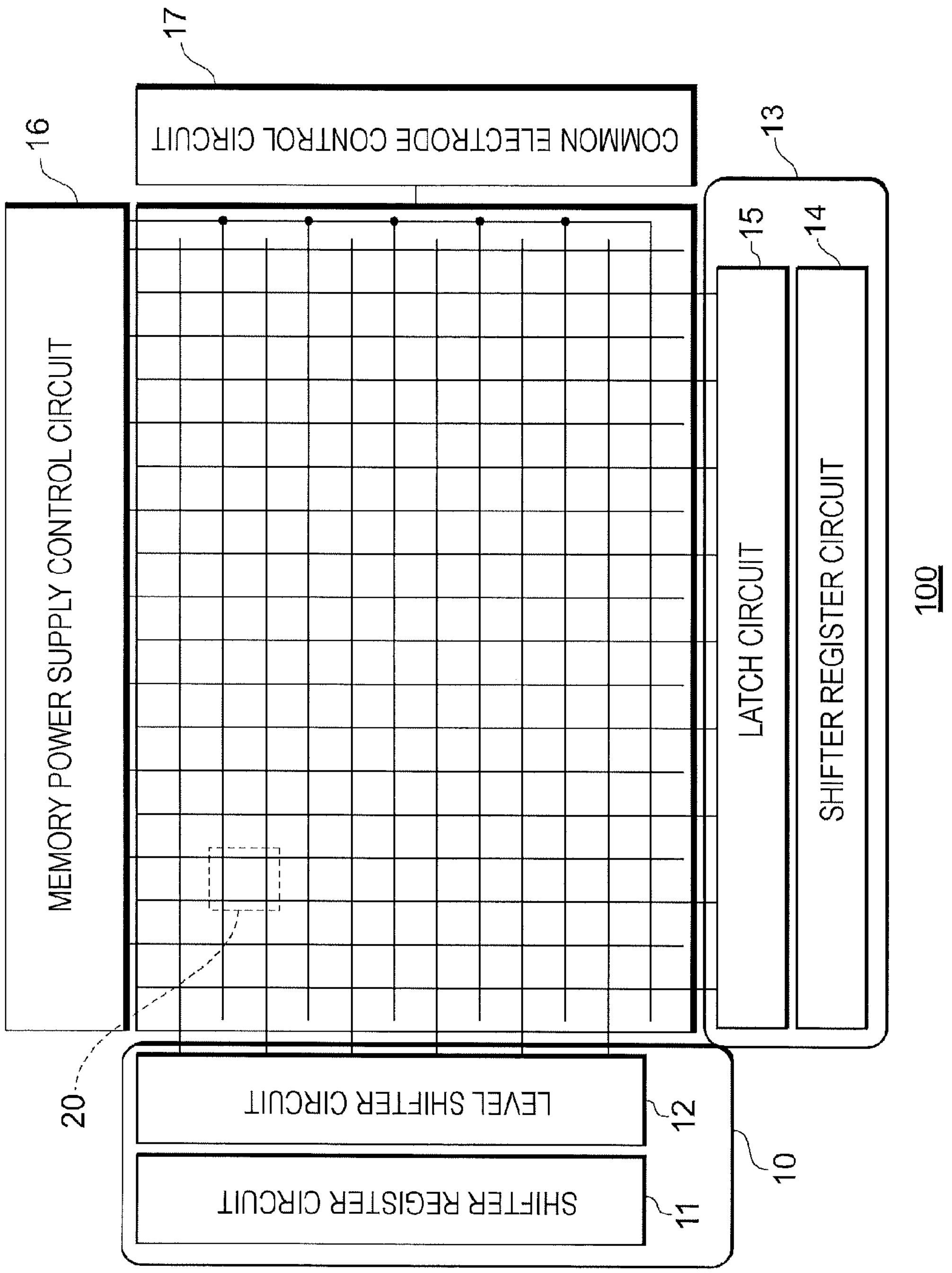
FIG. 1 is a block diagram showing the entire electrical configuration of an electrophoretic device according to an embodiment of the invention.

FIG. 1 is a block diagram showing the entire electrical configuration of an electrophoretic device according to an embodiment of the invention. An electrophoretic device 100 of the present embodiment includes a plurality of pixel sections 20 arranged at the intersections of a plurality of scan lines and a plurality of data lines arranged perpendicular to the scan lines. The pixels 20 are arranged in a matrix configuration.

Figure 2:
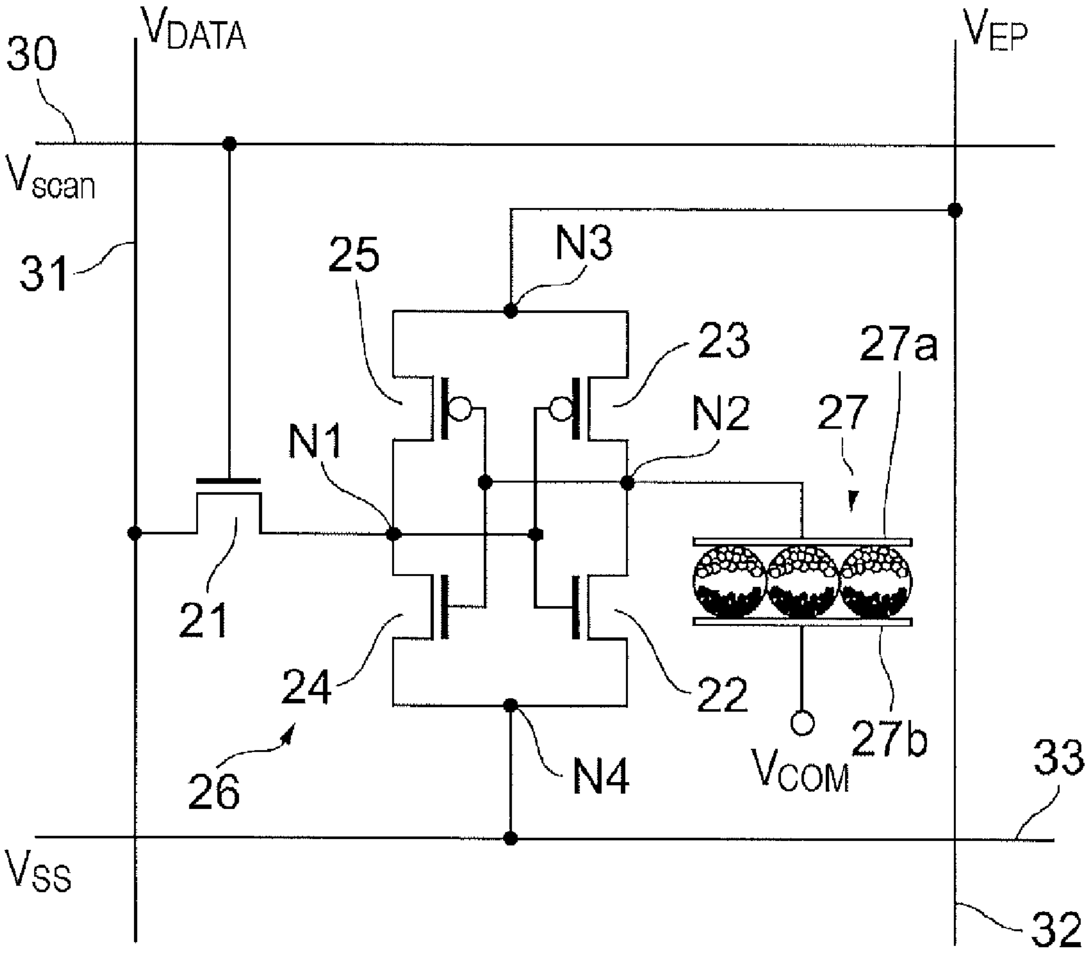
FIG. 2 is a circuit diagram for explaining a configuration of a pixel section.

FIG. 2 is a circuit diagram for explaining a configuration of each of the pixel sections 20. As shown in FIG. 2, each of the pixel sections 20 includes a transistor 21 as a switching element, a latch circuit 26 configured as a combination of four transistors 22, 23, 24, and 25, and an electrophoretic element 27.

The transistor 21 may be an n-channel field-effect transistor as depicted in the drawing. The transistor 21 has its gate connected to a scan line 30, one of its source and drain (input terminal) connected to a data line 31, and the other of its source and drain (output terminal) connected to an input terminal of the latch circuit 26.

The latch circuit (flip-flop circuit) 26 may be configured as a combination of two n-channel field-effect transistors 22 and 24 and two p-channel field-effect transistors 23 and 25, as depicted in the drawing. More specifically, the transistors 22 and 23 are connected to each other in such a manner that their sources or drains are connected to each other. The other of the source and drain of the transistor 22 is connected to a low-voltage power supply line 33. The other of the source and drain of the transistor 23 is connected to a high-voltage power supply line 32. Similarly, the transistors 24 and 25 are connected to each other in such a manner that their sources or drains are connected to each other. The other of the source and drain of the transistor 24 is connected to the low-voltage power supply line 33. The other of the source and drain of the transistor 25 is connected to a high-voltage power supply line 32. The gates of the transistors 22 and 23 are connected to a connection point N1 at which the sources or drains of the transistors 24 and 25 are connected to each other. The connection point N1 functions as the input terminal of the latch circuit 26. The input terminal N1 is connected to the other of the source and drain (output terminal) of the transistor 21, as depicted in the drawing. The gates of the transistors 24 and 25 are connected to a connection point N2 at which the sources or drains of the transistors 22 and 23 are connected to each other. The connection point N2 functions as the output terminal of the latch circuit 26. The input terminal N2 of the latch circuit 26 is connected to a first electrode 27*a* of the electrophoretic element 27. When the latch circuit 26 receives a high-potential signal at its input terminal N1, the latch circuit 26 outputs a low potential $V_{SS}$ from its output terminal N2. Meanwhile, when the latch circuit 26 receives a low-potential signal at its input terminal N1, the latch circuit 26 outputs a high potential $V_{EP}$ from its output terminal N2.

Figure 3:
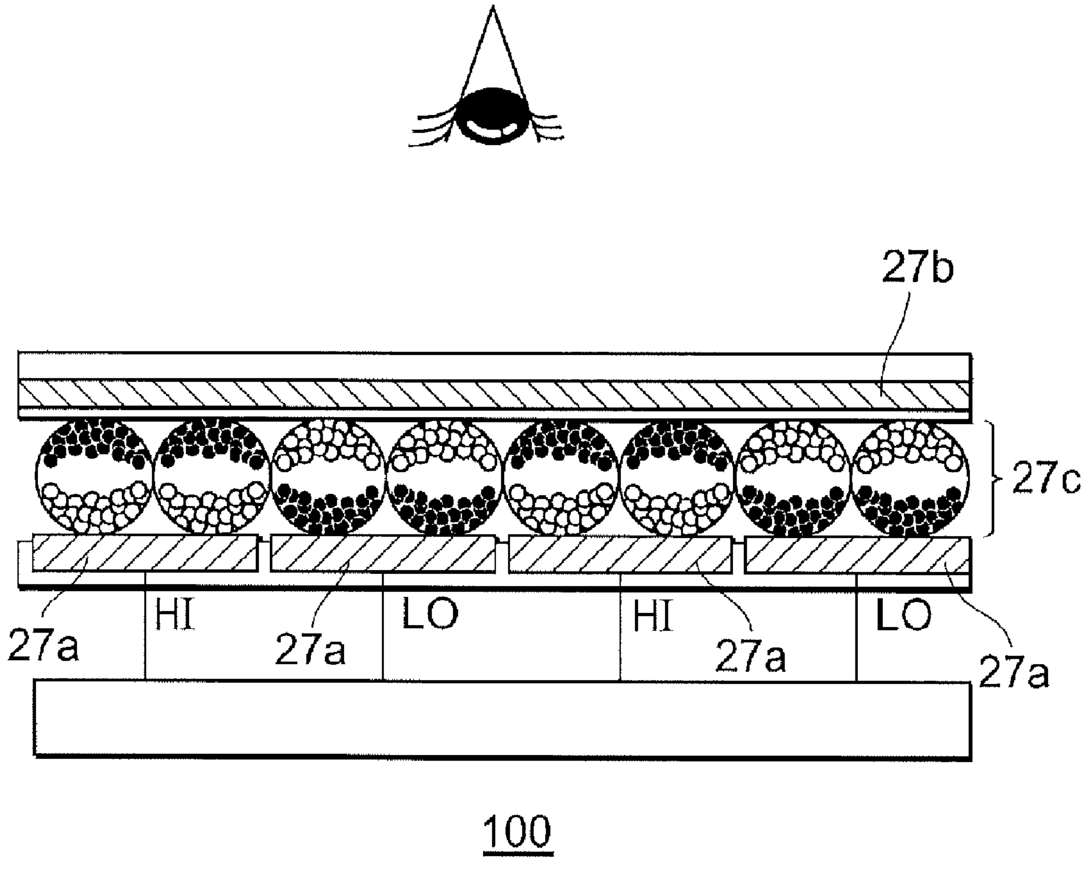
FIG. 3 is a schematic diagram showing an electrophoretic material.

The electrophoretic element 27 includes a first electrode 27*a*, a second electrode 27*b*, an electrophoretic material 27*c* (see FIG. 3 for reference) disposed between the electrodes 27*a* and 27*b*. In the present embodiment, the first electrode 27*a* is used as a pixel electrode provided for each of the pixel sections 20 in an independent manner. The second electrode 27*b* is used as a common electrode that is shared by the pixel sections 20. The second electrode 27*b* serving as the common electrode is supplied with a common electrode potential $V_{COM}$. Incidentally, in the present embodiment, the electrophoretic material 27*c* includes a plurality of microcapsules containing positively charged black particles and negatively charged white particles. The appearance of the electrophoretic material 27*c* is schematically shown in FIG. 3. As shown in the drawing, in the present embodiment, when the potential of the first electrode 27*a* is relatively higher than that of the second electrode 27*b*, the positively charged black particles and the negatively charged white particles are respectively moved toward the second electrode 27*b* and the first electrode 27*a*. In this state, when the pixel section 20 is viewed from the second electrode 27*b*, only a black color is observed. Meanwhile, when the potential of the first electrode 27*a* is relatively lower than that of the second electrode 27*b*, the positively charged black particles and the negatively charged white particles are respectively moved toward the first electrode 27*a* and the second electrode 27*b*. In this state, when the pixel section 20 is viewed from the second electrode 27*b*, only a white color is observed. That is, although the electrophoretic device 100 of the present invention is basically configured to perform a two-color (black and white) display, the electrophoretic device 100 may be configured to perform a gradation display by using a combination of a plurality of adjacent pixel sections 20. The form of the electrophoretic material 27*c* is not limited to such a microcapsule form. Moreover, the color tone of the particles is not limited to the combination of black and white colors, and the charged state of the particles is not limited to the above-mentioned states. Incidentally, the pixel section 20 may be viewed from either of the first electrode 27*a* and the second electrode 27*b*. In this way, the foregoing conditions may be suitably modified at the time of implementation.

Next, constituting blocks will be described with reference to FIG. 1. As shown in FIG. 1, the electrophoretic device 100 includes a scan-line driver 10, a data-line driver 13, a memory power supply control circuit 16, and a common electrode control circuit 17.

The scan-line driver (first driver) 10 supplies a control signal to the gate of one of the transistors 21 and thus controls turning ON and OFF of the transistor 21. The scan-line driver 10 includes a shifter register circuit 11 and a level shifter circuit 12. The shifter register circuit 11 includes flip-flops having a plurality of stages (whose number of stages corresponds to the number of scan lines 30) and outputs a control signal $V_{scan}$ to one of the scan lines 30 at predetermined intervals. The level shifter circuit 12 raises the voltage level of the control signal $V_{scan}$ output from the shifter register circuit 11. For example, in the present embodiment, the power supply voltage of the scan-line driver 10 is set to 5 V, and the power supply voltage of the level shifter circuit 12 is set to 7 V or higher. With such voltage settings, it is possible to prevent any fall in potential of the control signal to be supplied to the scan lines 30.

The data-line driver (second driver) 13 supplies a data signal for controlling the state of the pixel section 20 to the input terminal of the latch circuit 26. The data-line driver 13 includes a shifter register circuit 14 and a latch circuit 15. The shifter register circuit 14 includes flip-flops having a plurality of stages (whose number of stages corresponds to the number of data lines 31) and outputs a data signal $V_{DATA}$ to one of the data lines 31 at predetermined intervals. The latch circuit 15 retains the data signal $V_{DATA}$ output from the shifter register circuit 14 and outputs the data signal $V_{DATA}$ to the data lines 31. In the present embodiment, the data signal $V_{DATA}$ is transmitted in a dot-sequential manner rather than in a line-sequential manner.

The memory power supply control circuit (first power supply control circuit) 16 controls a power supply potential to be supplied to the latch circuit 26 included in each of the pixel sections 20. Here, the power supply potential to be controlled by the memory power supply control circuit 16 is classified into a high-potential side power supply potential $V_{EP}$ and a low-potential side power supply potential $V_{SS}$ (see FIG. 2 for reference). The high-potential side power supply potential $V_{EP}$ is supplied to the connecting point N3 of the transistors 23 and 25 in the latch circuit 26 through the power supply line 32, as described above. In the present embodiment, the high-potential side power supply potential $V_{EP}$ is variably set, and details of which will be described later. The low-potential side power supply potential $V_{SS}$ is supplied to the connecting point N4 of the transistors 22 and 24 in the latch circuit 26 through the power supply line 33, as described above. In the present embodiment, the low-potential side power supply potential $V_{SS}$ is set, for example, to a reference potential (ground potential level), but may be arbitrarily set to other potential levels.

The common electrode control circuit (second power supply control circuit) 17 controls a potential to be supplied to the second electrode (common electrode) 27*b* of the electrophoretic element 27. In the present embodiment, the potential controlled by the common electrode control circuit 17 (the potential hereinafter will be referred to as "common electrode potential") is also variably set, and details of which will be described later.

The electrophoretic device 100 of the present invention has such a configuration. Hereinafter, a method (i.e., a driving method) of supplying the driving signal to each of the pixel sections 20 will be described in detail. The driving method of the invention can be embodied by one of the following three methods.

First Driving Method

Figure 4:
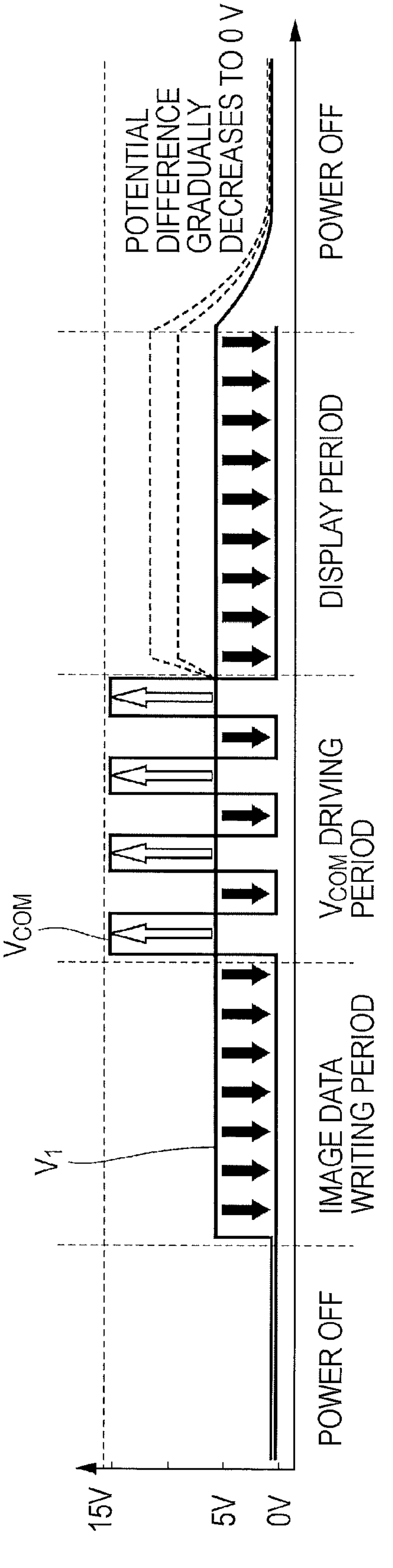
FIG. 4 is a signal waveform diagram for explaining a first driving method for driving the electrophoretic device according to the embodiment of the invention.
Figure 5:
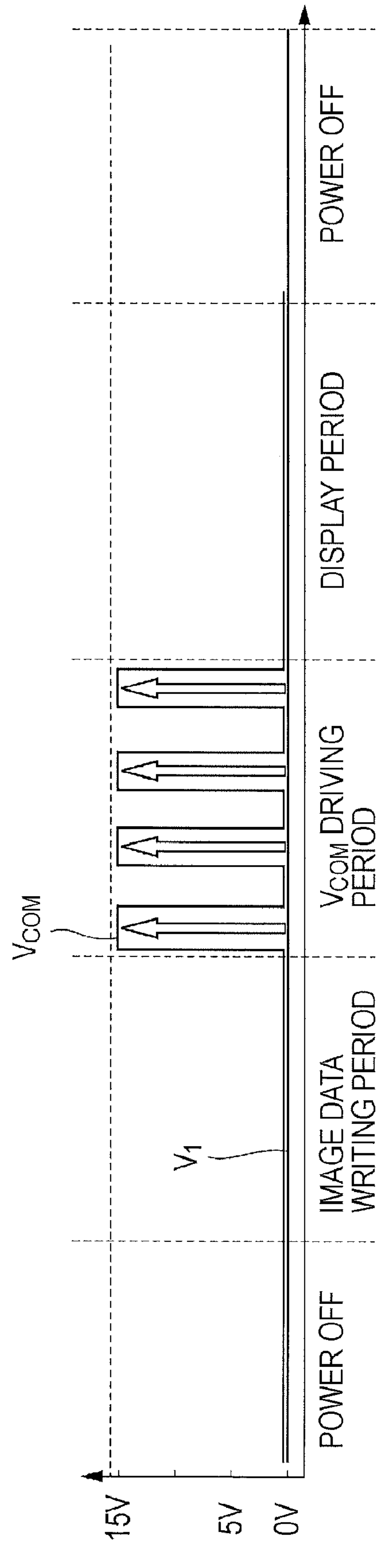
FIG. 5 is a signal waveform diagram for explaining the first driving method for driving the electrophoretic device according to the embodiment of the invention.

FIGS. 4 and 5 are signal waveform diagrams for explaining a first driving method for driving the electrophoretic device according to the embodiment of the invention. In the drawings, the horizontal axis represents time, and the vertical axis represents a voltage level. In the drawings, the potential of the first electrode 27*a* is depicted as "$V_1$," and the potential of the second electrode 27*b* is depicted as "$V_{COM}$" (the same statement can be applied to the following driving methods). First, a driving method for displaying a black color using one of the pixel sections 20 will be described with reference to FIG. 4.

In an image data writing period (first driving period), the reference potential is supplied from the common electrode control circuit 17 to the second electrode 27*b*. Here, "reference potential" corresponds to, for example, the ground potential level (0 V) as depicted in the drawing. In synchronization with the supply of the reference potential, the scan-line driver 10 supplies the control signal to the gate of one of the transistors 21 to turn ON the transistor 21, and the data-line driver 13 supplies the data signal to the input terminal N1 of the latch circuit 26. Here, "data signal" corresponds to one of a relatively high-potential signal (for example, 5 V) and a relatively low-potential signal (for example, 0 V). In the present embodiment, the high-potential signal (HIGH signal) corresponds to white display, and the low-potential signal (LOW signal) corresponds to black display. Since this example is concerned with the black display, the low-potential signal is supplied as the data signal. The low-potential signal is retained in the latch circuit 26 until a subsequent data writing operation is performed to the latch circuit 26. Accordingly, the first potential (for example, 5 V as depicted in the drawing) supplied from the memory power supply control circuit 16 is output from the output terminal N2 of the latch circuit 26. In this period, the electrophoretic element 27 is charged in such a manner that the potential $V_1$ of the first electrode 27*a* is set to the first potential, and the potential $V_{COM}$ of the second electrode 27*b* is set to the reference potential. As a result, the potential $V_1$ becomes greater than the potential $V_{COM}$. Accordingly, as schematically depicted by the black arrows in the drawing, a potential difference (electric field) of 5 V is generated across the electrodes 27*a* and 27*b* in a direction from the first electrode 27*a* toward the second electrode 27*b*. Accordingly, the pixel section 20 is controlled by the electric field so as to display a black color.

In a $V_{COM}$ driving period (second driving period) subsequent to the image data writing period, a driving signal (alternating signal) alternating between the reference potential (for example, 0 V as depicted in the drawing) and a second potential (for example, 15 V as depicted in the drawing) higher than the first potential is supplied from the common electrode control circuit 17 to the second electrode 27*b*. In this case, as described above, the potential $V_1$ of the first electrode 27*a* is maintained at the first potential (5 V in this example). Therefore, when the potential of the driving signal becomes higher than the first potential, the potential $V_{COM}$ of the second electrode 27*b* becomes higher than the potential $V_1$ of the first electrode 27*a* in the electrophoretic element 27. Accordingly, as schematically depicted by the white arrows in the drawing, a potential difference (electric field) of 10 V is generated across the electrodes 27_a_ and 27_b_ in a direction from the second electrode 27_b_ toward the first electrode 27_a_. Accordingly, the pixel section 20 is controlled by the electric field so as to display a white color. Meanwhile, when the potential of the driving signal becomes lower than the first potential, the potential $V_1$ of the first electrode 27_a_ becomes higher than the potential $V_{COM}$ of the second electrode 27_b_ in the electrophoretic element 27. Accordingly, as schematically depicted by the black arrows in the drawing, a potential difference (electric field) of 5 V is generated across the electrodes 27_a_ and 27_b_ in a direction from the first electrode 27_a_ toward the second electrode 27_b_. Accordingly, the pixel section 20 is controlled by the electric field so as to display a black color. In this way, by the supply of such an alternating driving signal, the black and white particles contained in the electrophoretic material 27_c_ are mixed with each other and thus placed in such a state that the particles are easily movable. The $V_{COM}$ driving period (second driving period) functions as a reset period for mixing the particles with each other in preparation of a subsequent displaying operation.

In the foregoing descriptions, a pulse-shaped driving signal (rectangular waveform driving signal) is illustrated as an example. The driving signal may have a square waveform in the present invention (the same statement can be applied to the following driving methods).

In a display period (third display period) subsequent to the $V_{COM}$ driving period, the reference potential (0 V in this example) is supplied from the common electrode control circuit 17 to the second electrode 27_b_. In this case, similar to the case of the foregoing periods, since the potential $V_1$ of the first electrode 27_a_ in the electrophoretic element 27 is maintained at the first potential (5 V in this example), the potential $V_1$ of the first electrode 27_a_ becomes higher than the potential $V_{COM}$ of the second electrode 27_b_. Accordingly, as schematically depicted by the black arrows in the drawing, a potential difference (electric field) of 5 V is generated across the electrodes 27_a_ and 27_b_ in a direction from the first electrode 27_a_ toward the second electrode 27_b_. Accordingly, the pixel section 20 is controlled by the electric field so as to display a black color. In the display period (third display period), it is also desirable that the high-potential side power supply potential $V_{EP}$ to be supplied from the memory power supply control circuit 16 to the latch circuit 26 is set to a third potential higher than the first potential so that the third potential (for example, in the range of 7 and 10 V) is output from the output terminal N2 of the latch circuit 26 (the third potential is depicted by the dotted lines in the drawing). With such a configuration, it is possible to further increase the potential difference caused in a direction from the first electrode 27_a_ toward the second electrode 27_b_ and thus further increase a display speed and contrast. When the power supply is cut off thereafter, the potential difference between the first and second electrodes 27_a_ and 27_b_ gradually decreases to 0 V.

Next, a driving method for displaying a white color using one of the pixel sections 20 will be described with reference to FIG. 5. Those descriptions overlapping with the foregoing descriptions will be omitted.

In the image data writing period, the reference potential is supplied from the common electrode control circuit 17 to the second electrode 27_b_. In synchronization with the supply of the reference potential, the scan-line driver 10 supplies the control signal to the gate of one of the transistors 21 to turn ON the transistor 21, and the data-line driver 13 supplies the data signal to the input terminal N1 of the latch circuit 26. Since the example is concerned with the white display, the high-potential signal is supplied as the data signal. The high-potential signal is retained in the latch circuit 26 until a subsequent data writing operation is performed to the latch circuit 26. Accordingly, the potential $V_{SS}$ supplied from the memory power supply control circuit 16 is output from the output terminal N2 of the latch circuit 26. In this period, the electrophoretic element 27 is charged in such a manner that the potential $V_1$ ($=V_{SS}$) of the first electrode 27_a_ becomes substantially equal to the potential $V_{COM}$ of the second electrode 27_b_. Therefore, there is no potential difference between the first electrode 27_a_ and the second electrode 27_b_. Accordingly, the displaying state of the pixel section 20 is not changed.

In the $V_{COM}$ driving period subsequent to the image data writing period, the driving signal alternating between the reference potential and the second potential higher than the first potential is supplied from the common electrode control circuit 17 to the second electrode 27_b_. In this case, as described above, the potential $V_1$ of the first electrode 27_a_ is maintained at the reference potential. Accordingly, as schematically depicted by the white arrows in the drawing, a potential difference (electric field) of 15 V is generated across the electrodes 27_a_ and 27_b_ in a direction from the second electrode 27_b_ toward the first electrode 27_a_. Accordingly, the pixel section 20 is controlled by the electric field so as to display a white color. That is, in the $V_{COM}$ driving period, by the supply of such an alternating driving signal, the black and white particles contained in the electrophoretic material 27_c_ are mixed with each other and thus placed in such a state that the white and black particles are easily movable toward the second electrode 27_b_ and the first electrode 27_a_, respectively. As a result, the pixel section 20 is controlled to display a white color.

In the display period subsequent to the $V_{COM}$ driving period, the reference potential is supplied from the common electrode control circuit 17 to the second electrode 27_b_. In this case, similar to the case of the foregoing periods, since the potential $V_1$ of the first electrode 27_a_ in the electrophoretic element 27 is maintained at the potential $V_{SS}$ equal to the reference potential, there is no potential difference between the first electrode 27_a_ and the second electrode 27_b_. Incidentally, since the pixel section 20 has been controlled to display a white color in the previous $V_{COM}$ driving period, the pixel section 20 maintains the white displaying state. Accordingly, the pixel section 20 is controlled to display a white color in the display period. When the power supply is cut off thereafter, the potential difference between the first and second electrodes 27_a_ and 27_b_ gradually decreases to 0 V.

In this way, in the case of using the first driving method, since a data writing operation is performed to the latch circuit 26 when the high-potential side power supply potential $V_{EP}$ of the memory power supply control circuit 16 is at a relatively low potential (5 V in this example), it is not necessary to install a level shifter circuit in the data-line driver 13. Accordingly, it is possible to decrease the overall circuit size.

Since the black and white particles are mixed with each other in the $V_{COM}$ driving period, latent images are not displayed on the pixel section 20 at the time of controlling the pixel section 20 to display a black color, thereby realizing a high-quality display.

Since in the display period, the high-potential side power supply potential $V_{EP}$ is raised from the first potential to the third potential higher than the first potential, it is possible to further increase a display contrast and a display-speed at the time of displaying a black color.

In the first driving method, if the black and white particles contained in the electrophoretic material 27_c_ are charged in an opposite manner to the case of the above-mentioned case, the pixel section 20 may be controlled in an opposite manner. That is, the pixel section 20 may be controlled to display a white color in accordance with the driving method described in connection with FIG. 4, and the pixel section 20 may be controlled to display a black color in accordance with the driving method described in connection with FIG. 5. The same statement can be applied to other driving method to be described later.

Second Driving Method

Figure 6:
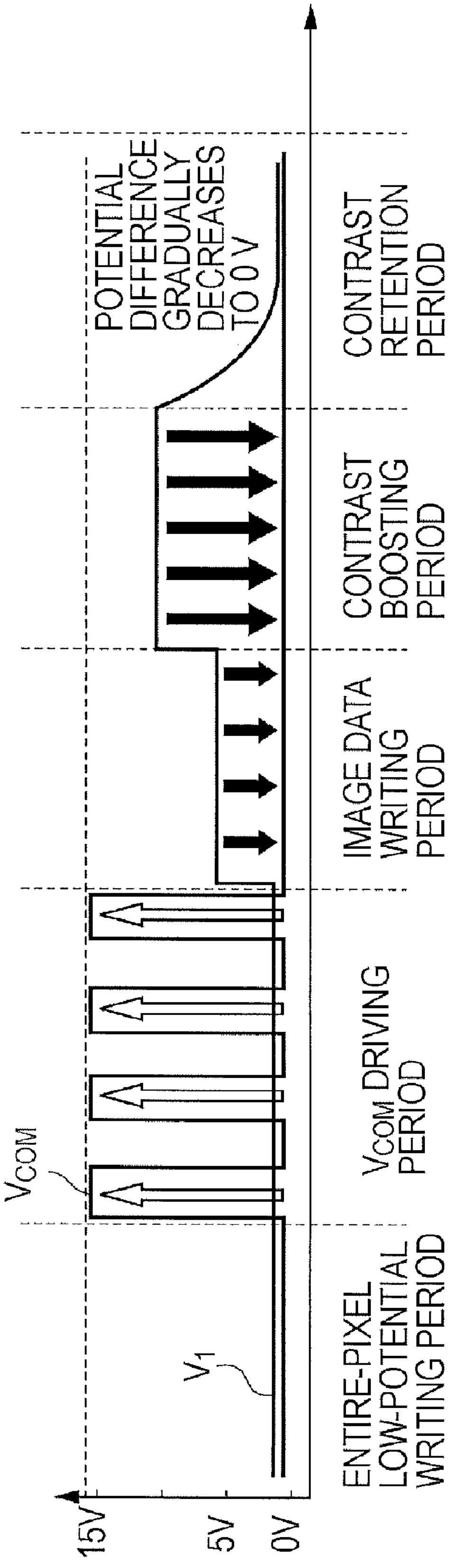
FIG. 6 is a signal waveform diagram for explaining a second driving method for driving the electrophoretic device according to the embodiment of the invention.
Figure 7:
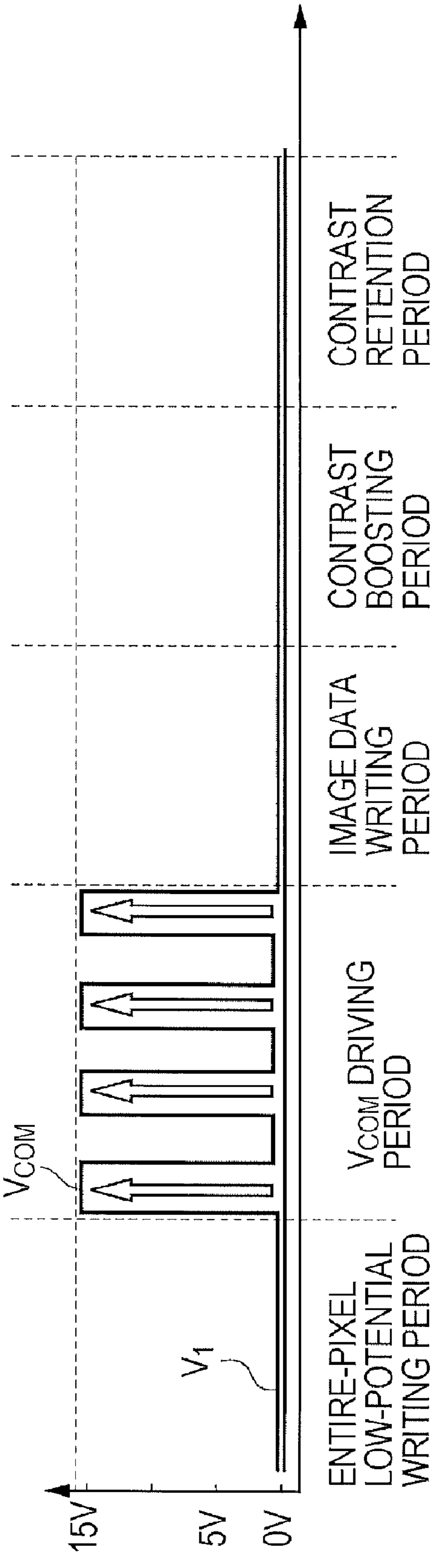
FIG. 7 is a signal waveform diagram for explaining the second driving method for driving the electrophoretic device according to the embodiment of the invention.

FIGS. 6 and 7 are signal waveform diagrams for explaining a second driving method for driving the electrophoretic device according to the embodiment of the invention. In the drawings, the horizontal axis represents a time, and the vertical axis represents a voltage level. First, a driving method for displaying a black color using the pixel section 20 will be described with reference to FIG. 6.

In an entire-pixel LOW-potential writing period (first driving period), the scan-line driver 10 supplies the control signal to the gate of one of the transistors 21 to turn ON the transistor 21, and the data-line driver 13 supplies the data signal to the input terminal N1 of the latch circuit 26. In the entire-pixel LOW-potential writing period, a high-potential signal is supplied to the input terminal N1 of the latch circuit 26. The high-potential signal is retained in the latch circuit 26 until a subsequent data writing operation is performed to the latch circuit 26. Accordingly, the potential $V_{SS}$ supplied from the memory power supply control circuit 16 is output from the output terminal N2 of the latch circuit 26. In the present embodiment, the potential $V_{SS}$ corresponds to the reference potential as described above. In this period, since the electrophoretic element 27 is charged in such a manner that the potential $V_1$ of the first electrode 27*a* is set to the potential $V_{SS}$ (=the reference potential), and the potential $V_{COM}$ of the second electrode 27*b* is set to the reference potential, there is no potential difference between the first and second electrodes 27*a* and 27*b*. Accordingly, the pixel section 20 maintains its previous displaying state. Such a writing operation is performed to the entire pixel sections 20.

In a $V_{COM}$ driving period (second driving period) subsequent to the entire-pixel LOW-potential writing period, a driving signal alternating between the reference potential and a second potential higher than the reference potential is supplied from the common electrode control circuit 17 to the second electrode 27*b*. In this case, as described above, the potential $V_1$ of the first electrode 27*a* is maintained at the reference potential. Accordingly, as schematically depicted by the white arrows in the drawing, a potential difference of 15 V is generated across the electrodes 27*a* and 27*b* in a direction from the second electrode 27*b* toward the first electrode 27*a*. Accordingly, the pixel section 20 is controlled by the electric field so as to display a white color. That is, in the $V_{COM}$ driving period, by the supply of such an alternating driving signal, the black and white particles contained in the electrophoretic material 27*c* are mixed with each other and thus placed in such a state that the white and black particles are easily movable toward the second electrode 27*b* and the first electrode 27*a*, respectively. As a result, the pixel section 20 is controlled to display a white color.

In an image data writing period (third driving period) subsequent to the $V_{COM}$ driving period, the reference potential is supplied from the common electrode control circuit 17 to the second electrode 27*b*. In synchronization with the supply of the reference potential, the scan-line driver 10 supplies a control signal to the gate of one of the transistors 21 to turn ON the transistor 21, and the data-line driver 13 supplies the data signal to the input terminal N1 of the latch circuit 26. Since this example is concerned with the black display, the low-potential signal is supplied as the data signal. The low-potential signal is retained in the latch circuit 26 until a subsequent data writing operation is performed to the latch circuit 26. Accordingly, the high-potential side power supply potential $V_{EP}$ supplied from the memory power supply control circuit 16 is output from the output terminal N2 of the latch circuit 26. In this example, the high-potential side power supply potential $V_{EP}$ corresponds to the first potential. In this period, the electrophoretic element 27 is charged in such a manner that the potential $V_1$ (=the first potential) of the first electrode 27*a* becomes higher than the potential $V_{COM}$ (=the reference potential) of the second electrode 27*b*. Accordingly, as schematically depicted by the black arrows in the drawing, a potential difference of 5 V is generated across the electrodes 27*a* and 27*b* in a direction from the first electrode 27*a* toward the second electrode 27*b*. Accordingly, the pixel section 20 is controlled by the electric field so as to display a black color.

In a contrast boost period (fourth driving period) subsequent to the image data writing period, a third potential higher than the first potential is generated as the high-potential side power supply potential $V_{EP}$ to be supplied from the memory power supply control circuit 16 to the latch circuit 26, and the third potential (for example, in the range of 7 and 10 V) is output from the output terminal N2 of the latch circuit 26. With such a configuration, it is possible to further increase the potential difference caused in a direction from the first electrode 27*a* toward the second electrode 27*b* and thus further increasing a display speed and contrast. When the power supply is cut off thereafter, the potential difference between the first and second electrodes 27*a* and 27*b* gradually decreases to 0 V.

Next, a driving method for displaying a white color using the pixel section 20 will be described with reference to FIG. 7. Those descriptions overlapping with the foregoing descriptions will be omitted.

In the entire-pixel LOW-potential writing period, the scan-line driver 10 supplies the control signal to the gate of one of the transistors 21 to turn ON the transistor 21, and the data-line driver 13 supplies the data signal to the input terminal N1 of the latch circuit 26. Since detailed operations for this period are the same as those of the foregoing black displaying case, descriptions thereof will be omitted.

In the $V_{COM}$ driving period subsequent to the entire-pixel LOW-potential writing period, a driving signal alternating between the reference potential and a second potential higher than the reference potential is supplied from the common electrode control circuit 17 to the second electrode 27*b*. Since detailed operations for this period are the same as those of the foregoing black displaying case, descriptions thereof will be omitted.

In the image data writing period subsequent to the $V_{COM}$ driving period, the reference potential is supplied from the common electrode control circuit 17 to the second electrode 27*b*. In synchronization with the supply of the reference potential, the scan-line driver 10 supplies a control signal to the gate of one of the transistors 21 to turn ON the transistor 21, and the data-line driver 13 supplies the data signal to the input terminal N1 of the latch circuit 26. Since this example is concerned with the white display, the high-potential signal is supplied as the data signal. The high-potential signal is retained in the latch circuit 26 until a subsequent data writing operation is performed to the latch circuit 26. Accordingly, the potential $V_{SS}$ (equal to the reference potential in this example) supplied from the memory power supply control circuit 16 is output from the output terminal N2 of the latch circuit 26. In this period, since the electrophoretic element 27 is charged in such a manner that there is no potential difference between the potential $V_1$ of the first electrode 27*a* and the potential $V_{COM}$ of the second electrode 27*b*, the displaying state of the pixel section 20 depends on its controlled state in the previous driving period. As a result, the pixel section 20 is controlled to display a white color.

In the contrast boost period (fourth driving period) subsequent to the image data writing period, the potential $V_{SS}$ (=the reference potential) is output from the output terminal N2 of the latch circuit 26, and the electrophoretic element 27 maintains its charged state in which there is no potential difference between the potential $V_1$ of the first electrode 27*a* and the potential $V_{COM}$ of the second electrode 27*b*. That is, the pixel section 20 is controlled to maintain the white displaying state. When the power supply is cut off thereafter, the potential difference between the first and second electrodes 27*a* and 27*b* gradually decreases to 0 V.

In this way, in the case of using the second driving method, since a data writing operation is performed to the latch circuit 26 when the high-potential side power supply potential $V_{EP}$ of the memory power supply control circuit 16 is at a relatively low potential, it is not necessary to install a level shifter circuit in the data-line driver 13. Accordingly, it is possible to decrease the overall circuit size.

Incidentally, in the $V_{COM}$ driving period, the electrophoretic element is controlled to preferentially display a white color while the black and white particles are mixed with each other. In this way, by controlling to preferentially display a white color and then a black color, it is possible to realize a high-quality display.

Since in the contrast boost period, the high-potential side power supply potential $V_{EP}$ is raised from the first potential to the third potential higher than the first potential, it is possible to further increase a display contrast and a display speed at the time of displaying a black color.

Third Driving Method

Figure 8:
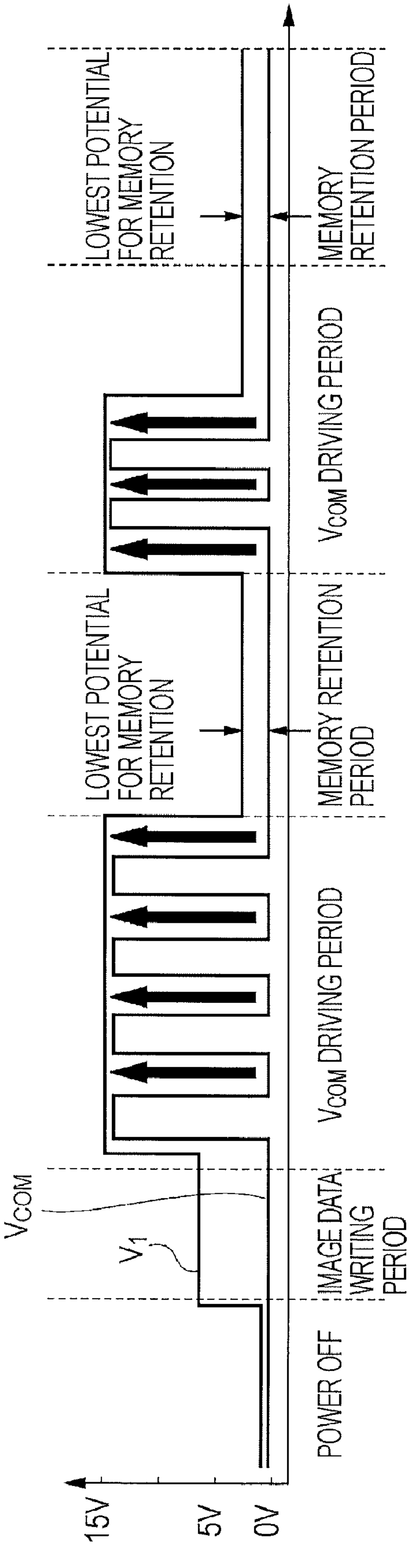
FIG. 8 is a signal waveform diagram for explaining a third driving method for driving the electrophoretic device according to the embodiment of the invention.
Figure 9:
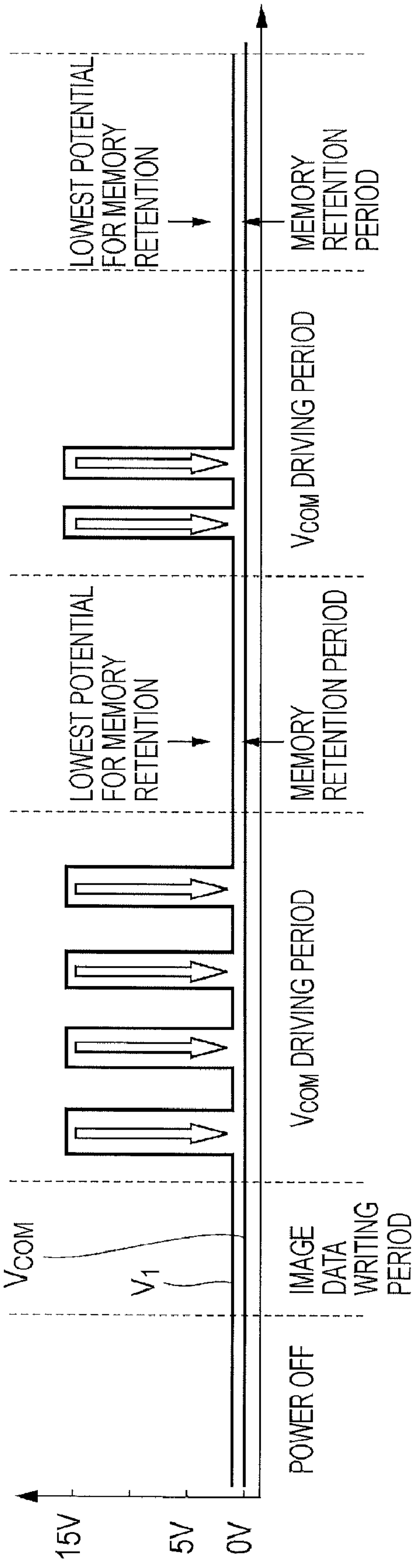
FIG. 9 is a signal waveform diagram for explaining the third driving method for driving the electrophoretic device according to the embodiment of the invention.

FIGS. 8 and 9 are signal waveform diagrams for explaining a third driving method for driving the electrophoretic device according to the embodiment of the invention. In the drawings, the horizontal axis represents a time, and the vertical axis represents a voltage level. First, a driving method for displaying a black color using the pixel section 20 will be described with reference to FIG. 8.

In an image data writing period (first driving period), the reference potential is supplied from the common electrode control circuit 17 to the second electrode 27*b*. In synchronization with the supply of the reference potential, the scan-line driver 10 supplies the control signal to the gate of one of the transistors 21 to turn ON the transistor 21, and the data-line driver 13 supplies the data signal to the input terminal N1 of the latch circuit 26. Since this example is concerned with the black display, the low-potential signal is supplied as the data signal. The low-potential signal is retained in the latch circuit 26 until a subsequent data writing operation is performed to the latch circuit 26. Accordingly, the first potential (for example, 5 V as depicted in the drawing) supplied as the high-potential side power supply potential $V_{EP}$ from the memory power supply control circuit 16 is output from the output terminal N2 of the latch circuit 26. In this period, the electrophoretic element 27 is charged in such a manner that the potential $V_1$ (=the first potential) of the first electrode 27*a* becomes higher than the potential $V_{COM}$ (=the reference potential) of the second electrode 27*b*. Accordingly, a potential difference of 5 V is generated across the electrodes 27*a* and 27*b* in a direction from the first electrode 27*a* toward the second electrode 27*b*. Accordingly, the pixel section 20 is controlled by the electric field so as to display a black color.

In a first $V_{COM}$ driving period (second driving period) subsequent to the image data writing period, a driving signal alternating between the reference potential and a second potential (for example, 15 V as depicted in the drawing) higher than the first potential is supplied from the common electrode control circuit 17 to the second electrode 27*b*. In synchronization with the supply of the driving signal, a potential equal to the second potential is supplied as the high-potential side power supply potential $V_{EP}$ from the memory power supply control circuit 16 to the output terminal N2 of the latch circuit 26. Therefore, when the potential of the driving signal becomes equal to the second potential, the electrophoretic element 27 is charged in such a manner that the potential $V_1$ of the first electrode 27*a* becomes equal to the potential $V_{COM}$ of the second electrode 27*b*. Accordingly, in this case, no potential difference is generated between the first and second electrodes 27*a* and 27*b*. Meanwhile, when the potential of the driving signal becomes equal to the reference potential, the electrophoretic element 27 is charged in such a manner that the potential $V_1$ (=the second potential) of the first electrode 27*a* becomes higher than the potential $V_{COM}$ (=the reference potential) of the second electrode 27*b*. Accordingly, as schematically depicted by the black arrows in the drawing, a potential difference of 15 V is generated across the electrodes 27*a* and 27*b* in a direction from the first electrode 27*a* toward the second electrode 27*b*. Accordingly, the pixel section 20 is controlled by the electric field so as to display a black color.

In a memory retention period (third display period) subsequent to the first $V_{COM}$ driving period, the reference potential is supplied from the common electrode control circuit 17 to the second electrode 27*b*. In synchronization with the supply of the reference potential, a third potential lower than the first potential is generated as the high-potential side power supply potential $V_{EP}$ to be supplied from the memory power supply control circuit 16 to the latch circuit 26, and the third potential (for example, in the range of 2 and 3 V) is output from the output terminal N2 of the latch circuit 26. In this case, the third potential corresponds to the lowest potential at which the data can be retained in the latch circuit 26. The memory retention period can be suitably set depending on the characteristics of the electrophoretic material 27*c* so as to maintain a display contrast. As an example, the memory retention period may be set in the range of several tens of minutes and several hours.

In a second $V_{COM}$ driving period (fourth driving period) subsequent to the memory retention period, it is controlled in the same manner as that for the first $V_{COM}$ driving period (second driving period). The second $V_{COM}$ driving period is designed to restore the display contrast to the initial state. For this reason, the number of pulses included in the driving signal may be smaller than that for the first $V_{COM}$ driving period. Thereafter, respective control operations in the third and fourth driving periods are suitably repeated so that the display contrast is maintained constant. When the power supply is cut off thereafter, the potential difference between the first and second electrodes 27*a* and 27*b* gradually decreases to 0 V.

In the memory retention period (third driving period), the potential of the first electrode 27*a* may be the reference potential. In such a driving method, since both the first and second electrodes 27*a* and 27*b* are at the reference potential and thus generating no potential difference between the electrodes, the pixel section 20 maintains its black displaying state at the time of the previous $V_{COM}$ driving period.

Next, a driving method for displaying a white color using the pixel section 20 will be described with reference to FIG. 9. Those descriptions overlapping with the foregoing descriptions will be omitted.

In the image data writing period, the reference potential is supplied from the common electrode control circuit 17 to the second electrode 27*b*. In synchronization with the supply of the reference potential, the scan-line driver 10 supplies the control signal to the gate of one of the transistors 21 to turn ON the transistor 21, and the data-line driver 13 supplies the data signal to the input terminal N1 of the latch circuit 26. Since this example is concerned with the white display, the high-potential signal is supplied as the data signal. The high-potential signal is retained in the latch circuit 26 until a subsequent data writing operation is performed to the latch circuit 26. Accordingly, the potential $V_{SS}$ (substantially equal to the reference potential in this example) supplied from the memory power supply control circuit 16 is output from the output terminal N2 of the latch circuit 26. In this period, the electrophoretic element 27 is charged in such a manner that the potential $V_1$ (=$V_{SS}$) of the first electrode 27*a* becomes substantially equal to the potential $V_{COM}$ (=the reference potential) of the second electrode 27*b*. Accordingly, since no potential difference is generated between the electrodes 27*a* and 27*b*, the pixel section 20 maintains its previous displaying state.

In the first $V_{COM}$ driving period subsequent to the image data writing period, a driving signal alternating between the reference potential and a second potential higher than the first potential is supplied from the common electrode control circuit 17 to the second electrode 27*b*. In synchronization with the supply of the driving signal, the low-potential side power supply potential $V_{SS}$ is supplied from the memory power supply control circuit 16 to the output terminal N2 of the latch circuit 26. Therefore, when the potential of the driving signal becomes equal to the second potential, the electrophoretic element 27 is charged in such a manner that the potential $V_1$ (=$V_{SS}$) of the first electrode 27*a* becomes equal to the potential $V_{COM}$ (=the second potential) of the second electrode 27*b*. Accordingly, as schematically depicted by the white arrows in the drawing, a potential difference of 15 V is generated across the electrodes 27*a* and 27*b* in a direction from the second electrode 27*b* toward the first electrode 27*a*. Accordingly, the pixel section 20 is controlled by the electric field so as to display a white color. Meanwhile, when the potential of the driving signal becomes equal to the reference potential, the electrophoretic element 27 is charged in such a manner that the potential $V_1$ of the first electrode 27*a* becomes substantially equal to the potential $V_{COM}$ of the second electrode 27*b*. Accordingly, in this case, no potential difference is generated between the first and second electrodes 27*a* and 27*b*. Therefore, the pixel section 20 maintains its white displaying state.

In the memory retention period subsequent to the first $V_{COM}$ driving period, the reference potential is supplied from the common electrode control circuit 17 to the second electrode 27*b*. Incidentally, the low-potential side power supply potential $V_{SS}$ supplied from the memory power supply control circuit 16 to the latch circuit 26 is not changed. The memory retention period can be suitably set depending on the characteristics of the electrophoretic material 27*c* so as to maintain a display contrast. As an example, the memory retention period may be set in the range of several tens of minutes and several hours.

In the second $V_{COM}$ driving period subsequent to the memory retention period, it is controlled in the same manner as that for the first $V_{COM}$ driving period. The second $V_{COM}$ driving period is designed to restore the display contrast to the initial state. For this reason, the number of pulses included in the driving signal may be smaller than that for the first $V_{COM}$ driving period. Thereafter, respective control operations in the third and fourth driving periods are suitably repeated so that the display contrast is maintained constant. When the power supply is cut off thereafter, the potential difference between the first and second electrodes 27*a* and 27*b* gradually decreases to 0 V.

In this way, in the case of using the third driving method, since a data writing operation is performed to the latch circuit 26 when the high-potential side power supply potential $V_{EP}$ of the memory power supply control circuit 16 is at a relatively low potential, it is not necessary to install a level shifter circuit in the data-line driver 13. Accordingly, it is possible to decrease the overall circuit size. Since the high-potential side power supply potential $V_{EP}$ is raised from the first potential to the third potential higher than the first potential after writing the image data, it is possible to reduce current consumption.

Moreover, relatively long memory retention period can be maintained until the second or subsequent $V_{COM}$ driving period is initiated for retaining and boosting a display contrast. In this regard, it is possible to reduce current consumption.

Next, examples of electronic apparatuses including the foregoing electrophoretic device as a display section will be described.

Figure 10A:
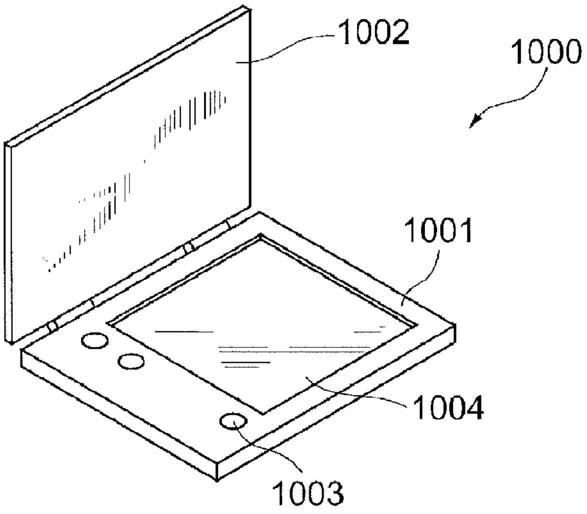
FIGS. 10A to 10C are perspective diagrams for explaining specific examples of electronic apparatuses including the electrophoretic device.
Figure 10B:
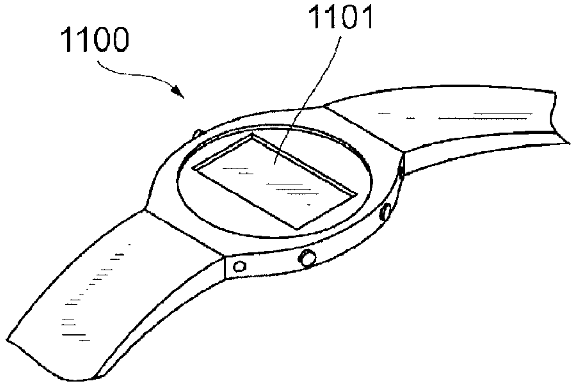
Figure 10C:
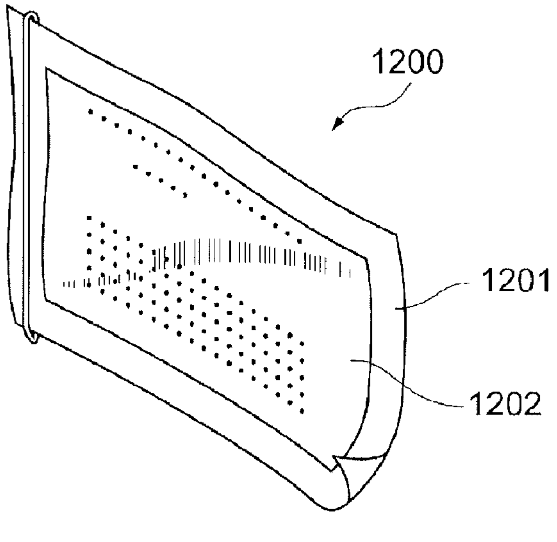

FIGS. 10A to 10C are perspective diagrams for explaining specific examples of electronic apparatuses including an electrophoretic device. FIG. 10A is a perspective diagram showing an electronic book as an example of the electronic apparatus. The electronic book 1000 includes a book-shaped frame 1001, a cover 1002 rotatably provided for the frame 1001 so as to be opened and closed, an operation section 1003, and a display section 1004 including the electrophoretic device according to any one of the foregoing embodiments. FIG. 10B is a perspective diagram showing an electronic watch as an example of the electronic apparatus. The electronic watch 1100 includes a display section 1101 including the electrophoretic device according to any one of the foregoing embodiments. FIG. 10C is a perspective diagram showing an electronic paper as an example of the electronic apparatus. The electronic paper 1200 includes a main body section 1201 including a rewritable sheet having a feel and flexibility similar to those of paper and a display section 1202 including the electrophoretic device according to any one of the foregoing embodiments. The electronic apparatus including the electrophoretic device is not limited to the electronic book 1000, the electronic watch 1100 or the electronic paper 1200. The electronic apparatus including the electrophoretic device can be widely applied to any apparatuses utilizing a visual change in color tone caused by movement of charged particles.

The invention is not limited to the foregoing embodiment. Various changes can be made to the invention without departing from the scope of the invention. For example, although the foregoing embodiment has been explained with reference to the case where the invention is applied to an electrophoretic device including a plurality of pixel sections arranged in a matrix configuration, the pixel section does not necessarily have such a matrix configuration. The application field of the invention is not limited to such an electrophoretic device for displaying purpose.

What is claimed is:

1. An electrophoretic device, comprising:

a switching element;

a latch circuit that receives an output signal from the switching element as its input signal; and an electrophoretic element that contains an electrophoretic material between its first and second electrodes, wherein the first electrode is driven by the output signal from the latch circuit, and wherein the latch circuit drives the first electrode using a plurality of different potentials without changing data stored therein.

2. An electrophoretic device, comprising:

a switching circuit;

a latch circuit having an input terminal connected to an output terminal of the switching element;

an electrophoretic element that contains an electrophoretic material between its first and second electrodes, the first electrode being connected to the output terminal of the latch circuit;

a first power supply control circuit that controls a power supply potential to be supplied to the latch circuit;

a first driver that controls turning ON of the switching element;

a second driver that supplies a data signal to the input terminal of the latch circuit; and a second power supply control circuit that controls a potential to be supplied to the second electrode of the electrophoretic element, wherein in a first driving period, the second power supply control circuit supplies the reference potential to the second electrode, the first driver turns ON the switching element, the second driver supplies a data signal to the input terminal of the latch circuit, and the first power supply control circuit supplies the reference potential or a first potential higher than the reference potential, wherein in a second driving period subsequent to the first driving period, the second power supply control circuit supplies a driving signal alternating between the reference potential and a second potential higher than the first potential to the second electrode, and wherein in a third driving period subsequent to the second driving period, the second power supply control circuit supplies the reference potential to the second electrode.

3. An electrophoretic device, comprising:

a switching circuit;

a latch circuit having an input terminal connected to an output terminal of the switching element;

an electrophoretic element that contains an electrophoretic material between its first and second electrodes, the first electrode being connected to the output terminal of the latch circuit;

a first power supply control circuit that controls a power supply potential to be supplied to the latch circuit;

a first driver that controls turning ON of the switching element;

a second driver that supplies a data signal to the input terminal of the latch circuit; and a second power supply control circuit that controls a potential to be supplied to the second electrode of the electrophoretic element, wherein in a first driving period, the first driver turns ON the switching element, the second driver supplies the data signal to the input terminal of the latch circuit, and the first power supply control circuit supplies the reference potential, wherein in a second driving period subsequent to the first driving period, the second power supply control circuit supplies a driving signal alternating between the reference potential and a second potential higher than the reference potential to the second electrode, and wherein in a third driving period subsequent to the second driving period, the second power supply control circuit supplies the reference potential to the second electrode, the first driver turns ON the switching element, the second driver supplies the data signal to the input terminal of the latch circuit, and the first power supply control circuit supplies the reference potential or a first potential higher than the reference potential to the output terminal of the latch circuit.

4. An electrophoretic device, comprising:

a switching circuit;

a latch circuit having an input terminal connected to an output terminal of the switching element;

an electrophoretic element that contains an electrophoretic material between its first and second electrodes, the first electrode being connected to the output terminal of the latch circuit;

a first power supply control circuit that controls a power supply potential to be supplied to the latch circuit;

a first driver that controls turning ON of the switching element;

a second driver that supplies a data signal to the input terminal of the latch circuit; and a second power supply control circuit that controls a potential to be supplied to the second electrode of the electrophoretic element, wherein in a first driving period, the second power supply control circuit supplies the reference potential to the second electrode, the first driver turns ON the switching element, and the second driver supplies the data signal to the input terminal of the latch circuit, whereby the reference potential or a first potential higher than the reference potential is output from the output terminal of the latch circuit, and wherein in a second driving period subsequent to the first driving period, the second power supply control circuit supplies a driving signal alternating between the reference potential and a second potential higher than the first potential to the second electrode, and the first power supply control circuit supplies the reference potential or the second potential to the output terminal of the latch circuit.

5. An electronic apparatus including the electrophoretic device as set forth in claim 1 as a display section.

* * * * *